United States Patent [19]

Kanluen et al.

[11] Patent Number: 4,874,827

[45] Date of Patent: Oct. 17, 1989

[54] PRODUCTION OF HIGHLY-DISPERSIBLE WATER-SOLUBLE POLYMERS

[75] Inventors: Ratana Kanluen, Guelph; Brigitte H. Licht, Burlington, both of Canada

[73] Assignee: Hart Chemical Limited, Guelph, Canada

[21] Appl. No.: 235,505

[22] Filed: Aug. 24, 1988

Related U.S. Application Data

[63] Continuation-in-part of Ser. No. 169,115, Mar. 9, 1988, abandoned, which is a continuation of Ser. No. 2,997, Jan. 13, 1987.

[51] Int. Cl.$^4$ .............................................. C08F 2/00
[52] U.S. Cl. ..................... 526/214; 522/84; 522/3; 522/13
[58] Field of Search ................ 526/214; 522/84, 3, 522/13

[56] References Cited

U.S. PATENT DOCUMENTS 4,612,336  9/1986  Tada et al. .............................. 522/3

FOREIGN PATENT DOCUMENTS 1379088  1/1975  United Kingdom .

OTHER PUBLICATIONS

CA 96(26): 218736y, 1982 by Erard et al.

Primary Examiner—Joseph L. Schofer
Assistant Examiner—N. Sarofin
Attorney, Agent, or Firm—Sim & McBurney

[57] ABSTRACT

The water dispersibility of water-soluble vinyl polymers, for example, polyacrylamides, is improved by incorporating a suitable surfactant in the monomer mixture from which the polymer is formed. The polymerization is effected by an initial phase of ultraviolet radiation-induced free radical polymerization until the monomer mix achieves the temperature at which chemically-induced free radical polymerization commences and then a terminal phase of chemically-induced free radical polymerization.

14 Claims, No Drawings

PRODUCTION OF HIGHLY-DISPERSIBLE WATER-SOLUBLE POLYMERS

This application is a continuation-in-part of copending U.S. patent application Ser. No. 169,115 filed Mar. 9, 1988 now abandoned which in turn is a continuation of U.S. patent application Ser. No. 2,997 filed Jan. 13, 1987.

FIELD OF INVENTION

The present invention relates to the production of highly-dispersible water-soluble polymers.

BACKGROUND TO THE INVENTION

Water-soluble polymers, of which acrylamide is a common species, are conventionally utilized in the form of dilute aqueous solutions. Although the polymers as manufactured can be dispersed in water to provide a homogeneous solution, care must be exercised in achieving an initial dispersion of polymer in water. Unless precautions are taken, the polymer, which is in particulate form, is likely to agglomerate upon wetting with water to form partially hydrated gels which are slow to dissolve and also have a tendency to plug liquid handling equipment. Although complete dissolution of the gels is possible, its achievement may require extended periods of time or special treatments to promote rapid dissolution of the gels.

It has previously been described, in U.S. Pat. Nos. 3,657,182 and 3,350,338, to coat water-soluble polymers, particularly polyacrylamide, with surfactants to render the polymers water dispersible and avoid agglomeration of polymer particles and the consequent gel formation and the resulting problems. Such prior art procedures suffer from the problem of ensuring a uniformity of coating so as to avoid effectively particle agglomeration.

SUMMARY OF INVENTION

In accordance with the present invention, highly-dispersible water-soluble polymers which resist agglomeration when introduced to water are produced by a novel process which overcomes the prior art problems noted above by incorporating a surfactant into the monomer mix prior to free-radical polymerization. The polymerization is effected in two steps, involving an initial polymerization by free radicals produced by an ultraviolet light decomposable free-radical initiator followed by polymerization by free radicals produced by a thermal decomposition of a thermally-decomposable free radical initiator. The polymerization is effected in the presence of a chain transfer agent to prevent cross-linking and formation of water-insoluble polymer.

GENERAL DESCRIPTION OF INVENTION

The choice of specific surfactant depends upon the specific polymer or copolymer to be formed in the polymerization step, and may be a non-ionic, anionic or cationic type. For example, for anionic and non-ionic polymers or copolymers, the most suitable surfactants are the anionic type, such as dialkyl sulfosuccinate. For cationic polymers or copolymers, salts of long chain amines are suitable. Non-ionic surfactants, such as alcohol or alkylphenol ethoxylates, for example, containing about 8 to 12 ethylene oxide units, may be employed for many polymers or copolymers.

The quantity of surfactant which is required to achieve high dispersibility of the polymer is very small, as a result of the uniformity of distribution which is achieved by incorporating the surfactant into the monomer mix. For example, as little as 0.2 wt. % of surfactant, based on the weight of monomer, may provide a product having a high degree of dispersibility.

In general, the quantity of surfactant employed may vary from about 50 to about 15,000 ppm, based on the weight of monomer, depending on the chemical nature of the polymer and the degree of dispersibility required. Since only small amounts of surfactant are employed to achieve the desired dispersibility, foam formation resulting from the detergency of the surfactant does not represent a problem.

The process of the present invention is applicable to the preparation of water-soluble polymers and copolymers of vinyl monomers or mixtures of monomers. Such vinyl monomers preferably have the formula:

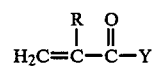

wherein: R represents hydrogen, a methyl group or an ethyl group;
Y represents

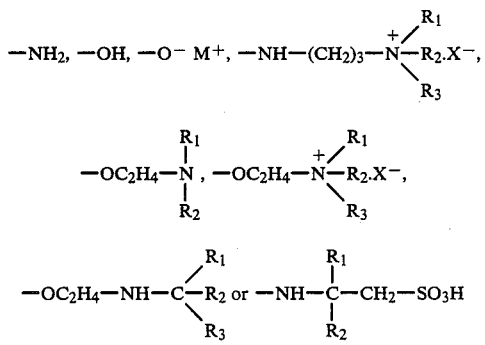

and its alkali metals salts;

$R_1$, $R_2$ and $R_3$ individually represent alkyl groups containing 1 to 4 carbon atoms;

$M^+$ represents ammonium or an alkali metal cation, and $X^-$ represents an anion.

Such vinyl monomers include acrylamide and its derivatives, dialkyl aminoethyl acrylate or methacrylate quaternized with dimethyl sulfate or methyl chloride, or methacrylamidopropyltrimethylammonium chloride. With such vinyl monomers, the surfactant may be a cationic surfactant which is a salt of a long chain primary, secondary or tertiary amine as well as a quaternary salt thereof.

For vinyl monomers including acrylamide and its derivatives, acrylic acid and its derivatives and 2-acrylamido-2-methyl propane sulfonic acid and its alkali metal salts, the surfactant may be a fatty alcohol, fatty acid or alkyl phenol ethoxylate containing about 8 to 12 ethylene oxide groups.

The vinyl monomers may be polymerized to a wide range of molecular weight of water-dispersible polymer, in the range of about 50,000 to about 15,000,000, using the two-stage free-radical initiated polymerization process described in more detail below. The presence of a surfactant in the monomer mixture results in the polymer possessing water dispersibility and hence the absence of a tendency to agglomerate and form gel.

The polymerization of the vinyl monomers is effected by a process involving a combination of both photochemical- and chemical-induced free radical formation, for the reasons discussed in detail in our copending U.S. patent application Ser. No. 002,975 filed Jan. 13, 1987, the disclosure of which is incorporated herein by reference. In summary of those reasons, the sequential initiations provide better control over the rate and degree of polymerization as well as affording a high degree of conversion, typically at least 99%.

In this polymerization process, both a photochemical and a chemical initiator are incorporated into the monomer mix. Polymerization of monomer commences photochemically by decomposition of an ultraviolet-decomposable free radical initiator using ultraviolet radiation and is continued until the temperature of the monomer system reaches a value sufficient to activate the heat-decomposable free-radical initiator, whereupon irradiation is terminated. The polymerization then continues to completion exclusively under the influence of chemically-produced free radicals or the so-called "thermal initiators".

Chain transfer agents also are included in the monomer mixture to assist in the free-radical induced polymerization, especially in the later stages of polymerization, when the highly-increased viscosity inhibits free radical movement, and also to control molecular weight and to prevent cross-linking and the formation of insoluble material.

The radiation source for photoinitiation may be a high energy one, such as X-ray, gamma ray, electron beam or short wavelength ultraviolet light. Preferably, a long wavelength ultraviolet light of about 300 to 400 nm, such as that which is normally obtained from a conventional low pressure mercury lamp, is employed, in view of the comparative safety of such lightsource. With such lightsource, it is necessary to utilize photoinitiators in the monomer mix to facilitate the initiation step.

The intensity of radiation applied during the initial photochemically-induced polymerization may vary widely, usually about 1000 to about 4000 microwatts/cm$^2$. The irradiation time usually is about 30 seconds to about 5 minutes.

In the polymerization process, the ultraviolet-decomposable free-radical initiators or photoinitiators are employed in an amount which depends on the activity of the initiator and the intensity of radiation applied. The amount ranges from about 40 to about 200 ppm, based on the weight of monomer. Any known photoinitiator may be employed, for example, benzophenone, benzoin and its alkyl ethers or other carbonyl-containing compounds.

The heat-decomposable or chemical free radical initiators may be selected from compounds known to generate free radicals upon heating, including azo-type compounds, persulfates and organic peroxides. Specific examples of azo-type compounds which are effective at temperatures of about 35° to 70° C. are 2,2'-azobis(2-amidinopropane) dihydrochloride, azobisisobutyronitrile, 2,2'-azobis-(2-methylpropionitrile) and 4,4'-azobis(4-cyanopentanoic acid). Such chemical free-radical initiators are employed in the process of the invention in amounts from about 50 to about 500 ppm, based on the weight of monomer.

Chain transfer agents may include formic acid and its alkali metal salts, secondary alcohols, for example, isopropanol, and water-soluble mercaptans. Such chain transfer agents are employed in amounts about 5 to about 25,000 ppm, based on the weight of the monomer, depending on the effectiveness of the chain transfer agent and the required polymer molecular weight.

The polymerization process typically is effected in a batch operation. An aqueous solution of the monomer is placed in the reaction vessel which may take the form of a shallow tray on a mobile support, to a depth, which can vary from a few millimeters, (about 2), to about 10 centimeters. The concentration of monomer in the solution also may vary widely, from about 30 to about 70 wt. %, depending on the chemical nature of the vinyl monomer and the required molecular weight of polymer. The polymerization process is complete in a relatively short period of time, generally from about 30 seconds to about 5 minutes.

U.S. Pat. No. 4,612,336 (Yada et al) describes a process of forming polyacrylamide and other water-soluble polymers by a multiple step process. The first step of the process involves the formation of an aqueous reaction medium of vinyl monomer solution which has a monomer concentration of at least 20 wt. %. To this solution is added a non-ionic or anionic surfactant in an amount of 0.001 to 1% by weight.

The purpose of the addition of the surfactant in the Yada et al process is to prevent cross-linking, which would otherwise result in water-insoluble polymers. The surfactant, therefore, is added to maintain solubility. It is also indicated in Yada et al that the presence of the surfactant decreases the tackiness of the polymer particles but again nothing is said about water dispersibility and prevention of gel formation. In the process invention, the formation of insoluble polymer is prevented by the use of a chain transfer agent and the surfactant acts to improve dispersibility.

As far as the applicants are aware, Yada et al is the only disclosure of a suggestion to add a surfactant to a monomer mix producing a water-soluble polymer but the purpose for which it is added in Yada et al, namely as an inhibitor of cross-linking, is quite different from the present invention and the results obtained herein would not be obtained inherently following the Yada et al process.

Other distinctions over Yada et al exist. Thus, Yada et al uses only a photoinitiator in the polymerization process and employs irradiation for about 30 to 60 minutes to obtain a very high molecular weight polymer. In contrast, the present invention uses two different free-radical initiators, is essentially complete in about 30 seconds to about 5 minutes with a very high degree of conversion and can produce polymers having a wide range of molecular weight.

EXAMPLES

Example 1

This Example illustrates the preparation of water-dispersible acrylamide powders.

A 40% (w/w) aqueous acrylamide solution was transferred into a polyethylene mixing tank. The solution was deaerated with nitrogen and 1.2% of sodium bis(2-ethylhexyl) sulfosuccinate was incorporated. The monomer mixture was agitated for 5 min. while deaerating. To this mixture were added 150 ppm of sodium formate as chain transfer agent, 45 ppm of 2,2-dimethoxy-2-phenylacetophenone, and 150 ppm of 2,2'- azobis(2-amidinopropane)dihydrochloride. The monomer mixture then was transferred into a polyethylene tray which was sealed with a UV transparent plastic material. The depth of the monomer solution was 60 mm. The mixture was irradiated with ultraviolet radiation from a conventional low pressure mercury lamp at a level of approximately 2700 microwatt/cm$^2$. The radiation was maintained until the temperature reached 38° C., whereupon the ultraviolet radiation was discontinued and polymerization allowed to continue for another 10 minutes under the influence of free radicals produced by the thermal initiator. The product was a firm rubbery gel. The yield was in excess of 99%.

The product was permitted to cool to room temperature before being particulated and dried in the fluid bed dryer at 40° C. for two hours.

The polymer so produced was highly dispersible and readily soluble in water. The Brookfield viscosity of an 0.5% aqueous polymer solution was 65 cps (spindle #1 at 12 rpm.). No lumps were observed in the dispersion.

Example 2

This Example illustrates the synthesis of highly dispersed anionic copolymer of acrylamide.

The procedure of Example 1 was repeated for an aqueous monomer solution containing 42.5 wt. % of a mixture of 70 mole % acrylamide and 30 mole % of acrylic acid, the pH of which was adjusted to 5.5 by the addition of sodium hydroxide. The monomer mixture was cooled to 10° C. before the addition of 50 ppm of sodium formate, 45 ppm of 2,2-dimethoxy-2-phenylacetophenone and 150 ppm of 2,2'-azobis(2-amidinopropane)dihydrochloride. In this instance, 0.65% of sodium dioctyl sulfosuccinate was used as the surfactant and the ultraviolet radiation was continued until the temperature reached 45° C.

The copolymer was highly dispersible and soluble in water. The Brookfield viscosity of an 0.1% polymer solution was 800 cps (spindle #2 at 12 rpm). The dispersion showed no lumps.

Example 3

This Example describes the dispersion test conducted on the polymers produced in Examples 1 and 2.

Approximately 2.0 g of the untreated polymer, polymers prepared by the process of this invention (Examples 1 to 3) or 4.0 g of polymer prepared by the post treatment process described in U.S. Pat. No. 3,657,182 was thrown in particulate form into 400 ml of cold tap water (25° C.) in a 600 ml beaker, all at once. After a few minutes, the resulting dispersion was gently stirred with a spatula. The observation was made for any formation of lumps and the rate of dissolution of polymer which can be detected by the rate of viscosity build-up. A highly dispersible polymer provides a uniform and rapid hydration, consequently contributing to fast dissolution.

A dispersion test was performed for the polymer of Example 1 and results compared with that of a similar polymer made by the post treatment process, and an untreated polymer. The polymer made by the procedure of Example 1 showed excellent dispersibility and the rate of dissolution was higher than that of either the post-treated or untreated polymers.

A further test showed that, for the post-treated polymer, it required a minimum of 2.5% of surfactant in order to acquire the same degree of dispersibility.

Moreover, the product of Example 1 possessed the free flowing property and although slightly hygroscopic (nature of the polymer), it would not create caking problem if kept dry.

SUMMARY OF DISCLOSURE

In summary of this disclosure, the present invention provides a novel procedure for imparting water dispersibility to water-soluble vinyl polymers by adding a surfactant to the monomer mixture prior to polymerization. The polymerization is effected using a combination of photochemically and chemically-induced initiation. Modifications are possible within the scope of this invention.

What we claim is:

1. A process for preparing a highly-dispersible particulate water-soluble polymer having a molecular weight in the range of about 50,000 to about 15,000,000, which comprises:

forming an aqueous reaction mixture comprising at least one vinyl monomer having a concentration of about 30 to about 70 wt. %, at least one surfactant selected from the group consisting of anionic, nonionic and cationic surfactants in an amount of about 50 to about 15,000 ppm based on the weight of monomer, at least one ultraviolet light-decomposable free-radical initiator in an amount of about 40 to about 200 ppm based on the weight of monomer, at least one heat-decomposable free-radical initiator in an amount of about 50 to about 500 ppm based on the weight of monomer, and at least one chain transfer agent in an amount of about 5 to about 25,000 ppm based on the weight of monomer;

sequentially polymerizing said monomer solution by first irradiating with long wavelength ultraviolet radiation to activate said ultraviolet light-decomposable free radical initiator, and when said monomer mixture reaches a temperature which activates said heat-decomposable initiator, discontinuing said irradiation and allowing the polymerization to continue to completion; and particulating the resulting polymer to produce a water-dispersible particulate water-soluble polymer having resistance to agglomeration and gel formation upon contact with water.

2. The process of claim 1 wherein said ultraviolet radiation is applied at an intensity of about 1000 to about 4000 watts/cm$^2$.

3. The process of claim 2 wherein said ultraviolet radiation has a long wavelength of about 300 to 400 mm.

4. The process of claim 3 wherein said ultraviolet radiation is applied to the reaction mixture for about 30 seconds to about 5 minutes.

5. The process of claim 1 wherein said heat decomposable initiator is effective at a temperature of about 35° to 70° C.

6. The process of claim 1 wherein said chain transfer agent is selected from the group consisting of formic acid and its alkali metal salts, secondary alcohols, hypophosphites, alkyl tertiary amines and water soluble mercaptans.

7. The process of claim 1 wherein said monomer mixture is transferred to a shallow tray to a depth of from about 2 mm to about 10 cm prior to said polymerization.

8. The process of claim 1 wherein said monomer is a vinyl monomer of the formula:

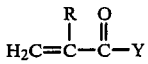

wherein: R represents hydrogen, a methyl group or an ethyl group;
Y represents

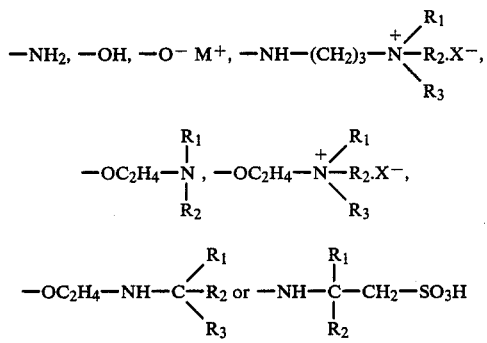

and its alkali metals salts;
$R_1$, $R_2$ and $R_3$ individually represent alkyl groups containing 1 to 4 carbon atoms;
$M^+$ represents ammonium or an alkali metal cation, and
$X^-$ represents an anion.

9. A process of claim 8 wherein said vinyl monomer is selected from the group consisting of acrylamide and its derivatives, dialkyl aminoethyl acrylate or methacrylate quaternized with dimethylsulfate or methyl chloride and methacrylamidopropyltrimethylammonium chloride, and said surfactant is a cationic surfactant selected from the group consisting of salts of long chain primary, secondary and tertiary amines and quaternary salts thereof.

10. A process of claim 8 wherein said vinyl monomer is selected from the group consisting of acrylamide and its derivatives, acrylic acid and its derivatives and 2-acrylamido-2-methylpropane sulfonic acid and its alkali metal salts, and said surfactant is an anionic surfactant solution from the group consisting of sodium dialkyl sulfosuccinate, sulfate and sulfonated fatty alcohols or a non-ionic surfactant selected from the group consisting of fatty alcohol, fatty acid and alkyl phenol ethoxylates containing about 8 to 12 ethylene oxide units.

11. The process of claim 9 wherein said thermal initiator is 2,2'azobis(2-amidinopropane)dihydrochloride and said photoinitator is 2,2-dimethoxy-2-phenylacetophenone.

12. The process of claim 10 wherein said thermal initiator is 2,2'azobis(2-amidinopropane)dihydrochloride and said photoinitator is 2,2-dimethoxy-2-phenylacetophenone.

13. The process of claim 11 wherein said chain transfer agent is sodium formate.

14. The process of claim 12 wherein said chain transfer agent is sodium formate.

* * * * *